Patented May 13, 1941

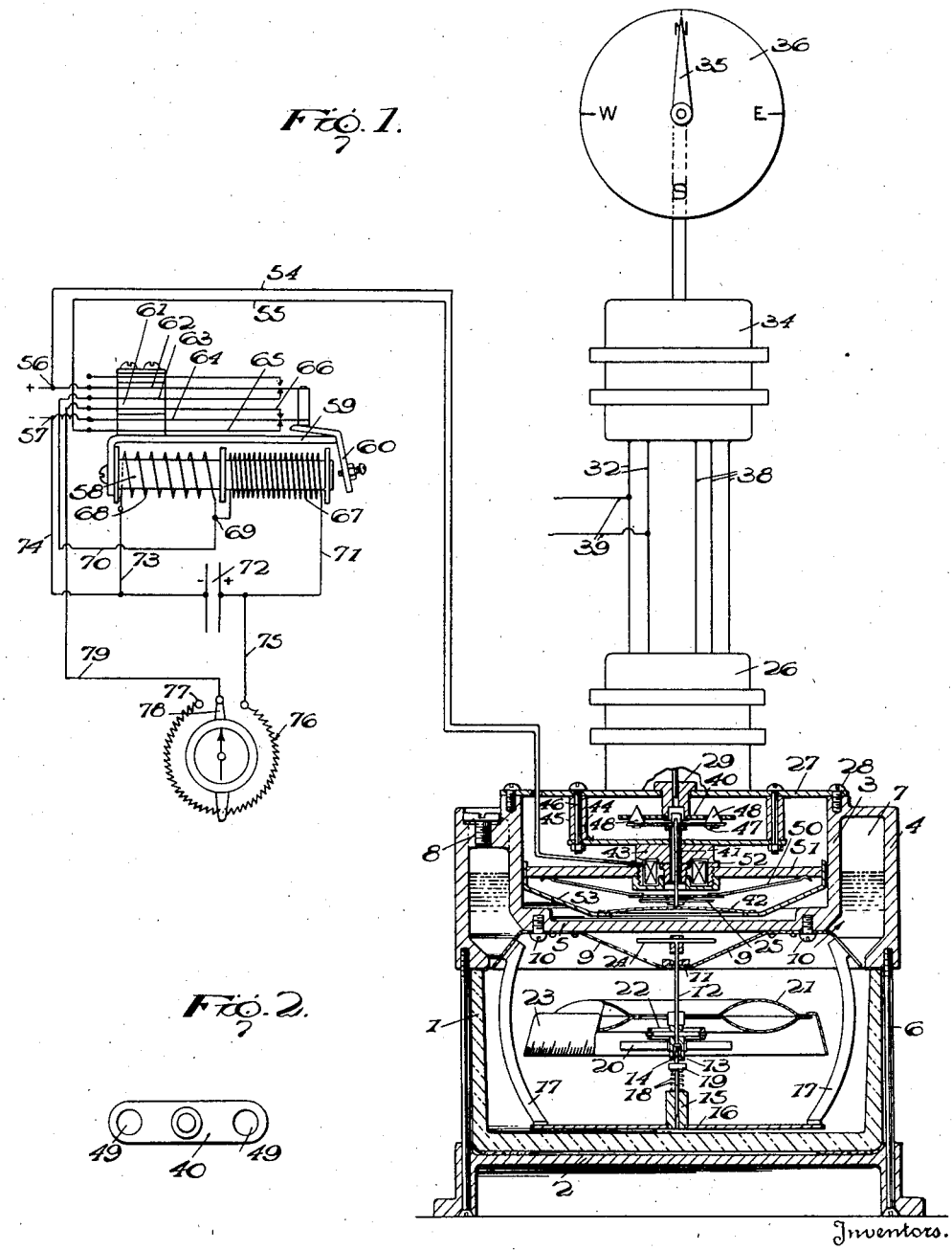

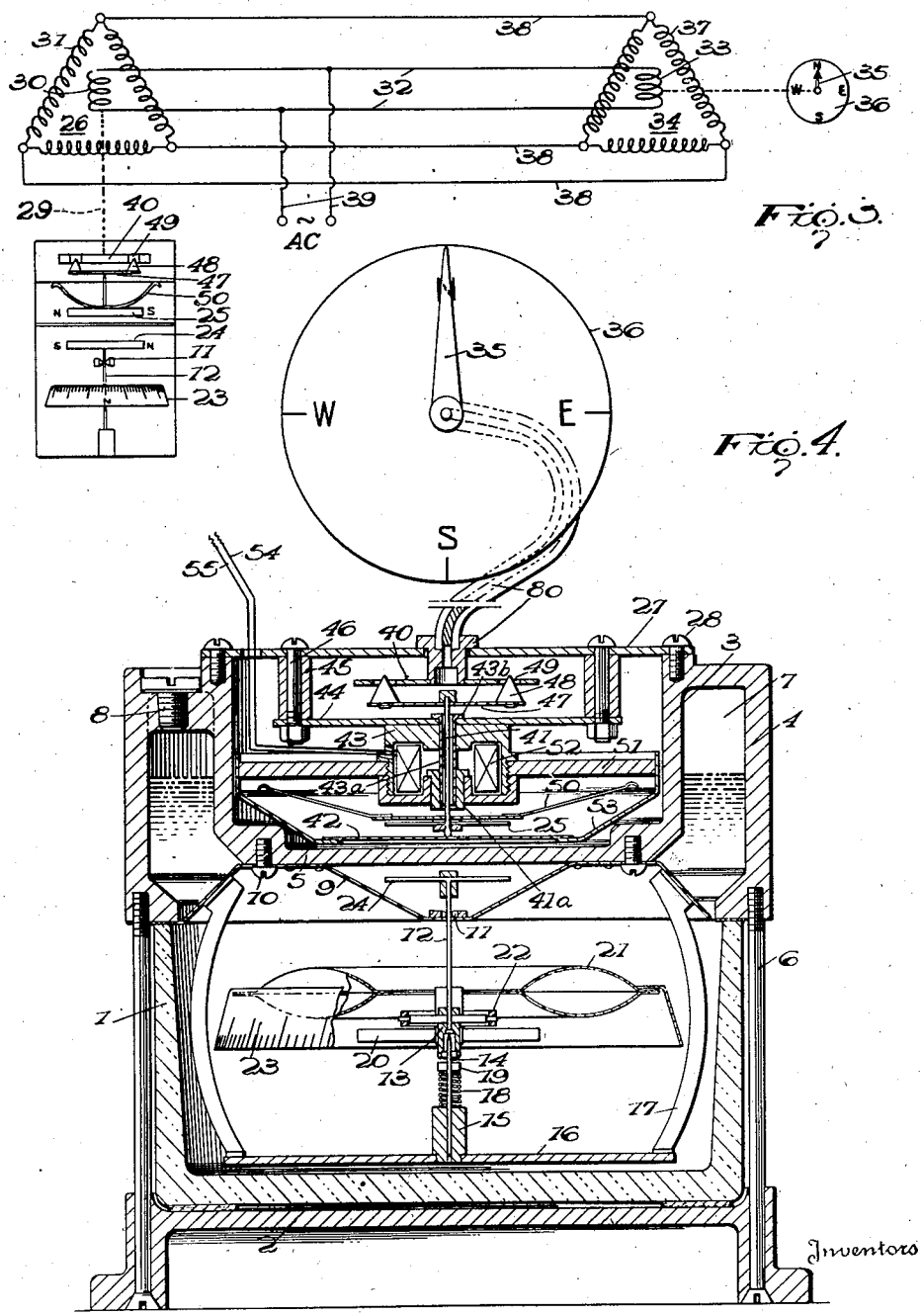

2,242,126

UNITED STATES PATENT OFFICE 2,242,126

REMOTE INDICATOR

Bradford B. Holmes, New York, and Wladimir A. Reichel, Bellerose, N. Y., assignors to Bendix Aviation Corporation, Bendix, N. J., a corporation of Delaware Continuation of application Serial No. 104,326, October 6, 1936. This application June 25, 1940, Serial No. 342,394

15 Claims. (Cl. 177—351)

This application is a continuation of our application Serial No. 104,326, filed October 6, 1936, and the invention relates to remote indicators and more particularly to remote reading magnetic compasses and to magnetic compass repeaters, that is, to means whereby the indication of a master instrument, as, for example the directional indication of a master magnetic compass, is reproduced or repeated by one or more indicators or repeaters located at points remote from said master instrument or compass.

Indicating repeating systems of various types are known to the art, as for example, repeating systems used in connection with gyro-compasses wherein the directional element is used directly or indirectly to control electric means for transmitting the compass indication to a remote repeater. In the case of magnetic compasses, however, such systems are not practicable, and special provision must be made, such as the use of an auxiliary motor and relays as heretofore proposed, in order to provide a repeater system which accurately reproduces the directional indications of the compass without in any way interfering with the operation of the compass itself.

One of the objects of the present invention is to provide novel apparatus for transmitting a function to a remote point and more particularly to provide a novel indicating repeater system wherein the transmission of an indication of an indicating instrument to a distant repeater indicator does not interfere in any way with the operation of the indicating instrument itself.

Another object of the invention is to provide a novel repeater system for magnetic compasses wherein the transmission of the compass indication to a distant repeater does not interfere in any way with the operation of the compass itself.

Another object is to provide a novel repeater system for magnetic compasses wherein the directional indication that is applied to the transmitting means is derived from the compass without any mechanical connection with the rotating parts of the compass itself.

Another object is to provide a novel repeater system for magnetic compasses wherein the transmitting means is driven by the compass by means of a simple power amplifying device without the use of an auxiliary motor and relays.

A further object is to provide a novel repeater system for magnetic compasses wherein synchronism is positively produced between the compass and the transmitting means whenever the system is in operation.

A still further object is to provide a novel repeater system for magnetic compasses which embodies a transmission of the self-synchronous or "autosyn" type.

Still another object is to provide a novel repeater system for magnetic compasses embodying a variable damping device whereby the operator can apply damping at will from a condition of practically undamped free swing up to complete aperiodicity.

The invention consists substantially in the construction, combination, location and relative arrangement of parts for obtaining the results desired in accordance with the foregoing objects, as will be more fully hereinafter set forth, as shown in the accompanying drawings by way of example, and as finally pointed out in the appended claims.

Two embodiments of the invention have been illustrated in the drawings, but it is to be expressly understood that said drawings are for purposes of illustration only and are not to be construed as a definition of the limits of the invention, reference being had to the claims for this purpose.

In the drawings,

Fig. 1 is a diagrammatic view of a repeater system embodying the invention with the magnetic compass and associated parts shown in section;

Fig. 2 is a detail of a part of the mechanism shown in Fig. 1;

Fig. 3 is a wiring diagram illustrating a suitable self-synchronous transmission;

Fig. 4 shows another repeater system embodying the invention.

A repeater system embodying the invention can be utilized in connection with a magnetic compass of any suitable type, size and construction, and broadly speaking, either mechanical or electrical means can be employed to cause an indicator at a remote point to follow the rotational movement of an indicator controlled by the compass. By way of example, Fig. 1 shows a magnetic compass of suitable construction combined with a remote indicator or repeater by means of an electrical transmission of the self-synchronous or "autosyn" type. Referring to this figure, the compass comprises a suitable cup-shaped casing or bowl 1 which may be transparent or not depending on whether it is desired to read the compass itself. As shown, said casing is of glass and is mounted in a suitable base 2. The upper open end of said bowl 1 is closed in any suitable manner to form a liquid-tight vessel and the closure is preferably constructed so as to provide a suitable bubble trap and expansion chamber. To this end a closure member is provided which comprises inner and outer concentric walls 3 and 4, respectively, the inner wall 3 being closed by an integral bottom wall 5 and the outer wall 4 being sealed to the bowl 1 by suitable means such as bolts 6 which are threaded into said wall 4 and extend through the base 2 to support the bowl 1 and to hold it in sealed relation to the upper closure member. The vessel thus formed is filed with liquid to a suitable level leaving an annular space 7 serving as a bubble trap and expansion chamber, the vessel being filled through an opening that is normally closed by the screw plug 8.

Rotatably mounted within the compass bowl 1 is a magnet system of any suitable type, said system preferably comprising a vertical shaft and a float system connected to said shaft by a universal mounting in the manner described and claimed in copending application Serial No. 103,040, filed September 28, 1936. As shown, arms 9 which are secured to the plate 5 in any suitable manner as by the screws 10 carry a suitable bearing 11 for a vertical shaft 12. The lower end of said shaft 12 terminates in a block 13 seated on the end of a vertical spindle 14 that is slidably mounted in a bearing 15 supported in the form shown by a plate 16 carried by arms 17 extending from the arms 9. The spindle 14 is preferably resiliently mounted by means such as a spring 18 interposed between the bearing 15 and a collar 19 secured to said spindle. Suitably mounted on the block 13 is a bar magnet 20, and a float 21 is universally mounted on said block by means of the gimbal ring 22, said float carrying a compass card 23.

In order to provide means which follows the movement of the card 23 without interfering with the operation of the compass, a magnet is provided outside the compass bowl and is arranged so as to follow the movements of the compass magnet 20 while at the same time said magnet is part of an astatic system whereby it does not influence the directional indication of the compass. To this end the upper end of the vertical shaft 12 carries a magnet 24 disposed within the compass bowl and cooperating with a similar magnet 25 that is rotatably mounted outside the compass bowl. As shown, said magnets 24 and 25 are parallel with the north end of one magnet adjacent the south end of the other magnet so that together they constitute an astatic unit which has no material influence on the directional indication of the compass due to the magnet 20. At the same time, said astatic unit follows closely the directional indications of magnet 20, the magnet 25, therefore, constituting an indicator which can be utilized to control the "autosyn" transmission referred to above.

Figs. 1 and 3 illustrate in diagrammatic form a suitable transmission of the "autosyn" type. As shown in Fig. 1, the transmitting motor 26 is mounted on a plate 27 that is secured to the upper portion of the compass bowl by means of screws 28. The enlarged shaft 29 of said transmitting motor, which extends rotatably through said plate 27, is connected to the rotor of the transmitting motor which has a single phase winding indicated at 30 in Fig. 3 and cooperating with a three-phase stator winding 31. The rotor winding 30 is connected by leads 32 with the single phase rotor winding 33 of the "autosyn" receiving motor 34, said rotor being connected in any suitable manner with the indicator or pointer 35 of a repeater compass 36. The three-phase stator winding 27 of the "autosyn" receiver is connected by wires 38 with the stator winding 31, and the rotor windings 30 and 33 are suitably energized by leads 39 which connect the wires 32 with a source of alternating current. This "autosyn" transmission may, for example, be of the type described and claimed in U. S. Patent No. 2,038,059 to Wladimir A. Reichel and Morris F. Ketay, dated April 21, 1936, and its operation is such that rotors 30 and 33 are maintained in synchronism so that the position of the pointer 35 of the compass repeater is maintained in synchronism with the position of the shaft 29 of the transmitter motor.

Means are provided whereby the shaft 29 of the transmitter motor 26 is caused to follow closely the movements of the magnet 25, said means comprising an auxiliary power amplifying device and being controlled by the magnet 25 to rotate an actuating arm 40 (Figs. 1 and 2) that is suitably secured to the end of the rotor shaft 29 in any suitable manner. As shown in Fig. 1, said magnet 25 is mounted on the lower end of a vertical shaft or spindle 41 which rests on a spring 42 and is capable of vertical axial reciprocation in a suitable bearing formed in a block 43 mounted in any suitable manner on the plate 27 as by means of the arm 44, spacers 45 and bolts 46.

At its upper end said spindle 41 carries an arm 47 that is provided at its ends with cones 48 engaging in openings 49 in the actuating arm 40. These parts are so arranged that when the spindle 41 is in its lowermost position, the points of the cones 48 project through the openings 49 so as to prevent complete separation of the cones 48 from the arm 40. If the centers or axes of said cones do not align with the centers of the openings 49, then when the spindle 41 is raised, said cones will tend to cause rotation of the actuating arm 40 and rotor shaft 29 to bring said centers into alignment. Suitable means such as radially extending arms 50 that are secured to said spindle and adapted to engage a friction plate 51 carried by the block 43 insure that such alignment shall be brought about by rotation of the actuating arm 40 rather than by rotation of the spindle 41 and arm 47. Thus, the initial upward axial movement of spindle 41 causes arms 50 to engage the friction plate 51 to hold said spindle against rotation. Upon further axial movement of said spindle 41, the arm 40 is caused to rotate by the centering action of the cones 48.

Since the spindle 41 and magnet 25 carried thereby follow the movements of the compass magnet 20 and card 23 by virtue of the magnetic coupling described above, vertical reciprocation of said spindle 41 will cause the actuating arm 40 of the "autosyn" transmitting motor to follow the movements of said compass magnet and card, whereby the pointer 35 of the repeater compass will give the same directional indication as the compass card 23.

Vertical reciprocation of the spindle 41 is provided by means of a suitable solenoid coil 52 that is mounted in the block 43 and is periodically energized to lift said spindle by magnetic attraction of a soft iron plunger 41a, see Fig. 4, carried by and movable with a sleeve 43a through which the spindle 41 extends, the sleeve 43a having a head 43b which strikes the arm 47 to lift it and the spindle 41. With the spindle in its elevated position as shown in Fig. 1, the supporting spring 42 is bowed upwardly, and when the solenoid 52 is de-energized, plunger 41a and spindle 41 descend by their own weight and flatten out the spring 42 so that said spring assists the solenoid in lifting the plunger and spindle and also delays the descent thereof, preventing bounce. Spring 42 may be supported in any suitable manner and as shown is carried by a supporting member 53 secured to the plate 51.

The frequency of elevation of spindle 41 should be rapid enough to insure proper control of the actuating arm 40 by the arm 47. Within limits of satisfactory control, however, it is possible to vary the length of the period in a cycle of reciprocation during which the spindle is in its lower position, so that damping of the compass movement is effected. For example, if the spindle is down for relatively long periods, it can take steps that are long enough to keep up with the compass movements and little or no damping results. On the other hand, if the spindle is down for very short intervals, it can move only in very short steps and will not keep up with the rapid movements of the compass. In this event, the magnetic coupling described above results in magnetic damping of the compass movements, and the degree of such damping can be controlled and varied by regulating said periods, preferably by keeping the "up" periods constant while varying the "down" periods.

While many of the advantages of the invention can be attained without providing such variable damping, through the use of any suitable electrical means for periodically energizing and de-energizing the solenoid 52, it is desirable to employ means whereby the period of de-energization can be varied so as to provide for damping the compass movements to the extent desired. Fig. 1 shows a suitable electric timing circuit and relay whereby this operation can be secured, said timing circuit and relay being of the type disclosed in patent to Bradford B. Holmes, No. 2,080,273, dated May 11, 1937.

As shown in Fig. 1, the solenoid 52 is energized by leads 54 and 55, lead 54 being connected to the positive terminal 56 of a suitable source of current and lead 55 being connected through the relay to the negative terminal 57 as hereinafter described. The relay comprises a core 58 having secured thereto an arm 59 on which is pivotally mounted an armature 60 normally assuming the position shown. Mounted on the arm 59 by means of blocks 61 are a plurality of resilient contact strips suitably arranged so that movement of armature 60 causes breaking of some circuits and closing of others. As illustrated, positive terminal 56 is connected to a strip 62 that makes contact with an adjacent strip 63, and the negative terminal 57 is connected to a strip 64 that makes contact with a strip 65 to which the lead 55 is connected, or with a strip 66. As shown, when the relay is open, the circuit of solenoid coil 52 is completed and the spindle 41 is in "up" position.

The relay core 58 carries two coils 67 and 68 having a common terminal 69, the coil 67 having more turns and greater resistance than the coil 68. In the relay position shown, said terminal 69 is connected to the positive terminal 56 through a wire 70 and contacts strips 63 and 62, respectively, so that current flows through said coils in parallel, the coils being so wound as to oppose one another so that the armature 60 is not operated. Current flowing through coil 67 is conducted by a wire 71 to the positive plate of a condenser 72 and current flowing through coil 68 is conducted by wires 73 and 74 to the negative terminal 57, the negative plate of condenser 72 also being connected to wire 73. As the condenser 72 becomes charged, current through coil 67 is weakened with the result that coil 68 acts to shift the position of armature 60. The circuit of solenoid 52 is then broken due to disengagement of contact between strips 64 and 65 and spindle 41 descends or drops to the "down" position. The circuit to terminal 69 is also broken by disengagement of contact strips 62 and 63 so that neither coil 67 or 68 is connected to the positive terminal 56 and condenser 72 can now discharge through coils 67 and 68 in series and wires 73, 74 to negative terminal 57. The coils 67 and 68 are now additive and hold the relay closed until the condenser is discharged, whereupon the relay opens and the cycle is repeated. To vary the time during which the relay is closed and the spindle is down, a parallel discharge path is provided which contains a variable resistance and comprises in the form shown a wire 75, a resistance 76 having a blank end 77, a contact arm 78, and a wire 79 leading to the contact strip 66. When the relay is closed, this parallel circuit is completed by engagement of the contact strips 64 and 66, so that a variable portion of the condenser current can discharge therethrough. With contact arm 78 on the blank end 77, all of the discharge current must pass through coils 67 and 68 in series so that the down periods of the spindle are relatively large and there is substantially no damping. As the resistance 76 is cut out, however, the down periods become progressively shorter and damping is increased.

Fig. 4 shows another form of repeater system embodying the present invention wherein the "autosyn" transmission of Figs. 1 and 3 is replaced by mechanical means such as flexible shaft or cable. The construction of the compass, the astatic coupled magnet system, the vertically reciprocating spindle, the reciprocating solenoid, and the relay (not shown) is the same as above described in connection with Fig. 1 except that the plunger 41a and spindle 41 are shown in the down position, and the same reference characters are applied in order to avoid duplication of description. The actuating arm 40, however, is secured to the end of a flexible shaft or cable 80 which is suitably connected to rotate the pointer 35 of the repeater 36. The operation of this system will be clear from the above description of Figs. 1 to 3.

From the foregoing description, it will be seen that the invention provides means whereby the directional indication of a master magnetic compass may be transmitted to a remote repeater without affecting the operation of the compass itself except as damping of the compass movements is intentionally provided. The magnet system 24, 25 follows closely the movements of the magnet 20, and positive synchronism is secured by the mechanical cooperation between the arm 47 and the actuating arm 40 so that the repeater pointer 35 always repeats the directional indication of the compass card 23. The power required to move the actuating arm 40 is provided by a simple solenoid with a make and break timing circuit and without the use of an auxiliary motor and other mechanism heretofore proposed. At the same time provision may be made for variable damping of the compass movements by regulating the cycle of movement of the reciprocating spindle.

While two embodiments of the invention have been described herein and illustrated in the drawings, it will be understood that the invention is not limited thereto but is capable of a variety of mechanical embodiments many of which will now be apparent to those skilled in the art and that changes may be made in the form, details of construction and arrangement of parts without departing from the spirit of the invention. Reference is accordingly to be had to the appended claims for a definition of the limits of the invention.

What is claimed is:

1. A remote reading compass comprising a magnet rotatable under the influence of the earth's magnetic field, a rotatable member, means controlled in rotation by said magnet and movable successively into and out of engagement with said member for angularly positioning the latter, a remote indicator, and an electrical transmission for maintaining angular synchronism between said member and indicator.

2. A remote reading compass comprising a magnet rotatable under the influence of the earth's magnetic field, a rotatable member, means controlled in rotation by said magnet and movable successively into and out of engagement with said member for angularly positioning the latter, a remote indicator, transmission means for maintaining angular synchronism between said member and indicator, and means for preventing rotation of said magnet upon angular positioning of said member.

3. A remote reading compass comprising a magnet rotatable under the influence of the earth's magnetic field, a rotatable member, rotatable means controlled in rotation by said magnet and movable into engagement with said member for angularly positioning the latter, a power device for moving said means periodically into said engagement, a remote indicator, transmission means for maintaining angular synchronism between said member and indicator, and means for preventing rotation of said magnet upon angular positioning of said member.

4. A remote reading compass comprising a magnet rotatable under the influence of the earth's magnetic field, a rotatable and axially movable element, means for angularly positioning said element according to the position of said magnet comprising an auxiliary magnet magnetically coupled for rotation with said first magnet, means for moving said element axially, a rotatable member engaged by said element on axial movement and angularly positioned thereby, a remote indicator, and transmission means for maintaining angular synchronism between said member and indicator.

5. A remote reading compass comprising a magnet rotatable under the influence of the earth's magnetic field, a rotatable and axially movable element, means for angularly positioning said element according to the position of said magnet, solenoid controlled power means for moving said element axially, a rotatable member engaged by said element on axial movement thereof and angularly positioned thereby, a remote indicator, and transmission means for maintaining angular synchronism between said indicator and member.

6. A remote reading compass comprising a magnet rotatable under the influence of the earth's magnetic field, an auxiliary magnet magnetically coupled with said first magnet to follow the directional indication thereof, a rotatable member connected for rotation with said auxiliary magnet, electromagnetic means for moving said member axially, means for periodically energizing and de-energizing said means to cause reciprocation of said rotatable member, a second rotatable member, means connecting said members whereby said first member angularly positions said second member on movement thereof by said electromagnetic means, a remote indicator, and transmitting means for maintaining angular synchronism between said second member and said indicator.

7. Means for electrically transmitting the indications of a magnetic compass to a remote point comprising a self-synchronous electrical transmission having a transmitting rotor and a receiving rotor that are maintained in synchronism, means connected to said receiving rotor for indicating direction at a remote point, and a rotatable element controlled in rotation by said compass and movable into and out of engagement with said transmitting rotor for angularly positioning the latter in accordance with the directional indication of said compass.

8. A remote reading compass comprising a magnet rotatable under the influence of the earth's magnetic field, a rotatable member, means controlled in rotation by said magnet and movable successively into and out of engagement with said member for angularly positioning the latter, a remote indicator, and mechanical transmission means including a flexible shaft connecting said rotatable member and remote indicator for transmitting the angular movement of said member to said indicator.

9. Apparatus for electrically transmitting the indications of a magnetic compass to a remote point without the use of a follow-up motor to cause follow-up movements of the compass bowl of the compass, comprising a self-synchronous electric motor having a stator and a rotor, a magnet rotatable under the influence of the earth's magnetic field, a rotatable member controlled by said magnet so as to assume the same positions as said magnet upon a change in compass direction and capable of axial movement, means effective upon axial movement of said member to angularly position the rotor of said self-synchronous motor, means for axially moving said member at intervals, a remote self-synchronous electric motor having its stator and rotor electrically connected to the stator and rotor, respectively, of the first-mentioned self-synchronous motor, whereby the rotor of the second motor is caused to follow the angular positions of the rotor of the first motor, and indicating means controlled by the rotor of the second motor.

10. A remote indicating device comprising a rotatable member controlled by a function to be indicated at the remote point, a second rotatable member capable of axial movement, means magnetically coupling said two rotatable members whereby the second member is caused to follow the angular movement of the first member, means for axially moving said second member at intervals, a third rotatable member, means effective upon axial movement of said second member to angularly position the third member in accordance with the angular position of the first member, a remote indicator, and mechanical transmission means including a flexible shaft connecting said third rotatable member and remote indicator for transmitting the angular movement of said third member to said indicator.

11. Apparatus for electrically transmitting the indications of a magnetic compass to a remote point without the use of a follow-up motor, comprising a magnetic compass having a magnet rotatable under the influence of the earth's magnetic field, an electrical transmitting device at the compass and having a rotor and a stator in electromagnetic relation with each other, an electrical receiving device at the remote point and also having a rotor and stator in electromagnetic relation with each other, means electrically connecting said transmitting device to said receiving device for controlling angular movement of the receiver rotor by the transmitter rotor, an indicator at said receiving device and connected thereto for actuation thereby, and means directly coupling the rotor of said transmitting device to said magnet for angularly positioning said rotor according to the angular position of said magnet, whereby the angular movement of the rotor of said transmitting device causes corresponding angular movement of the rotor of said receiving device to actuate said indicator.

12. Apparatus for electrically transmitting the indications of a magnetic compass to a remote point without the use of a follow-up motor, comprising a magnetic compass having a magnet rotatable under the influence of the earth's magnetic field, an electrical transmitting device at the compass and having a rotor and a stator in electromagnetic relation with each other, an electrical receiving device at the remote point and also having a rotor and stator in electromagnetic relation with each other, means electrically connecting said transmitting device to said receiving device for controlling angular movement of the receiver rotor by the transmitter rotor, an indicator at said receiving device and drivably connected thereto for actuation thereby, and means comprising a pair of coupling magnets directly coupling the rotor of said transmitting device to said compass magnet for angularly positioning said rotor according to the angular position of said compass magnet, whereby the angular movement of the rotor of said transmitting device causes corresponding angular movement of the rotor of said receiving device to actuate said indicator.

13. Apparatus for electrically transmitting to a remote point a function to be indicated at said remote point without the use of a follow-up motor, comprising a sensitive measuring instrument provided with a rotary part controlled by the function to be indicated and having very little available torque, an electrical transmitting device at the measuring instrument and having a rotor and a stator in electromagnetic relation with each other, an electrical receiving device at the remote point and also having a rotor and a stator in electromagnetic relation with each other, means electrically connecting said transmitting device to said receiving device for controlling angular movement of the receiver rotor by the transmitter rotor, indicating means at said receiving device and drivably connected to the rotor thereof for actuation thereby, and means comprising a pair of coupling magnets directly coupling the rotor of the transmitting device to the rotary part of said measuring instrument for angularly positioning said transmitter rotor according to the angular position of the rotary part of said measuring instrument, whereby the angular movement of the rotor of said transmitting device causes corresponding angular movement of the rotor of said receiving device to actuate said indicating means.

14. Apparatus for transmitting to a remote point a function to be indicated at said remote point without the use of a follow-up motor, comprising a sensitive measuring instrument provided with a rotary part controlled by the function to be indicated and having very little available torque, a rotatable member, means controlled in rotation by the rotary part of said measuring instrument and movable successively into and out of engagement with said rotatable member for angularly positioning the latter, a remote indicator, and an electrical transmission for maintaining angular synchronism between said rotatable member and indicator.

15. Apparatus for electrically transmitting the indications of a magnetic compass to a remote point without the use of a follow-up motor, comprising a magnetic compass having a magnet rotatable under the influence of the earth's magnetic field, an electrical transmitting device at the compass and having a rotor and a stator associated in cooperative relation with each other, an electrical receiving device at the remote point and also having a rotor and a stator associated in cooperative relation with each other, an indicator at said receiving device and drivably connected to the rotor thereof for actuation thereby, means electrically connecting said transmitting device to said receiving device for controlling angular movement of the receiver rotor by and in accordance with the angular movement of the transmitter rotor, and means directly coupling the rotor of said transmitting device to said compass magnet for angularly positioning said rotor according to the angular position of said magnet, whereby the angular movement of said transmitter rotor causes corresponding angular movement of said receiver rotor to actuate said indicator.

BRADFORD B. HOLMES.
WLADIMIR A. REICHEL.